United States Patent
Moliner-Cantos

(10) Patent No.: US 9,677,415 B2
(45) Date of Patent: Jun. 13, 2017

(54) GAS TURBINE ELECTRICAL MACHINE ARRANGEMENT

(71) Applicant: ROLLS-ROYCE PLC, London (GB)

(72) Inventor: Fermin Moliner-Cantos, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 14/919,099

(22) Filed: Oct. 21, 2015

(65) Prior Publication Data

US 2016/0130971 A1    May 12, 2016

(30) Foreign Application Priority Data

Nov. 12, 2014  (GB) .................................. 1420105.7

(51) Int. Cl.
| | |
|---|---|
| F02B 63/04 | (2006.01) |
| H02K 7/10 | (2006.01) |
| F01D 15/10 | (2006.01) |
| F02C 7/32 | (2006.01) |
| F01D 15/12 | (2006.01) |
| H02K 7/116 | (2006.01) |
| H02K 7/18 | (2006.01) |

(52) U.S. Cl.
CPC ............. *F01D 15/10* (2013.01); *F01D 15/12* (2013.01); *F02C 7/32* (2013.01); *H02K 7/116* (2013.01); *H02K 7/1823* (2013.01); *F05D 2220/323* (2013.01); *F05D 2220/76* (2013.01); *F05D 2240/20* (2013.01); *F05D 2240/60* (2013.01); *F05D 2250/314* (2013.01); *F05D 2260/40* (2013.01); *F05D 2260/4031* (2013.01)

(58) Field of Classification Search
CPC . F01D 15/10; F01D 15/12; F02C 7/32; H02K 7/116; H02K 7/1823
USPC .......................................................... 290/1 C
See application file for complete search history.

(56) References Cited

U.S. PATENT DOCUMENTS

| | | | | |
|---|---|---|---|---|
| 6,058,791 | A * | 5/2000 | Brunet ...................... | F02C 7/32 192/69.9 |
| 8,490,411 | B2 * | 7/2013 | Suciu ........................ | F02C 7/32 60/788 |
| 2004/0222716 | A1 | 11/2004 | Bosen | |
| 2008/0148881 | A1 * | 6/2008 | Moniz ...................... | F02C 7/32 74/15.6 |
| 2009/0290976 | A1 * | 11/2009 | Suciu ...................... | F01D 25/18 415/122.1 |

(Continued)

FOREIGN PATENT DOCUMENTS

| | | |
|---|---|---|
| EP | 1939429 A2 | 7/2008 |
| EP | 2128389 A2 | 12/2009 |

(Continued)

OTHER PUBLICATIONS

Apr. 27, 2015 British Search Report issued in Britain Application No. 1420105.7.

(Continued)

*Primary Examiner* — Tulsidas C Patel
*Assistant Examiner* — Thomas Quigley
(74) *Attorney, Agent, or Firm* — Oliff PLC

(57) ABSTRACT

A gas turbine engine comprising an electrical machine 30, 130, 200, 210, the electrical machine 30, 130, 200, 210 having an axis of rotation that is canted with respect to the main rotational axis of the gas turbine engine.

11 Claims, 4 Drawing Sheets

(56) References Cited

U.S. PATENT DOCUMENTS

| | | | |
|---|---|---|---|
| 2010/0327589 A1* | 12/2010 | Macchia | F01D 15/10 290/52 |
| 2012/0117982 A1 | 5/2012 | Suciu et al. | |
| 2013/0038057 A1* | 2/2013 | McLoughlin | F01D 15/10 290/31 |
| 2014/0020506 A1* | 1/2014 | Duong | F16H 1/222 74/665 GB |

FOREIGN PATENT DOCUMENTS

| | | |
|---|---|---|
| FR | 2946091 A1 | 12/2010 |
| GB | 2443743 A | 5/2008 |
| GB | 2467209 A | 7/2010 |

OTHER PUBLICATIONS

Mar. 24, 2016 Search Report issued in European Patent Application No. 15190733.

* cited by examiner

GAS TURBINE ELECTRICAL MACHINE ARRANGEMENT

The present disclosure concerns gas turbine electrical machine arrangements. It may have particular relevance to electrical machines used in aero gas turbine engines but is not intended to be limited to such applications.

Particularly in the field of aircraft engines, gas turbines typically have an electrical machine connected to an ancillary gearbox of the engine. The ancillary gearbox provides torque from a main shaft of the gas turbine to components such as oil pumps, fuel pumps and the electrical machine. When powered by the shaft, the electrical machine is used to generate electrical power, which may for example be used onboard an aircraft associated with the engine. In some cases the electrical machine may also be capable of a secondary motor function that may be used during starting of the gas turbine engine to accelerate it to a self-sustaining speed.

In the case of aero gas turbine engines at least, the compactness and arrangement of the various engine components is an important design consideration. Specifically, increases in nacelle size and/or further compromises to its aerodynamic profile may increase drag and reduce efficiency. It is therefore desirable to design components such as the ancillary gearbox and electrical machine bearing in mind the potential impact of their size, arrangement and interrelationships with other engine components.

According to a first aspect of the invention there is provided a gas turbine engine comprising an electrical machine, the electrical machine having an axis of rotation that is optionally canted with respect to the main rotational axis of the gas turbine engine. This may allow tighter packaging of the electrical machine within the remainder of the gas turbine engine, especially as the diameter of the electrical machine increases with respect to its axial length. Electrical machines having larger diameters may (as explained further below) lend themselves to giving a larger step-down ratio as mechanical power is delivered to the electrical machine. This may be advantageous where a relatively large rotational speed differential between a rotor of the electrical machine and a shaft coupled thereto is desirable (e.g. to limit electrical machine centrifugal forces). Electrical machines with larger diameters may also offer increased torque density. $T \propto D^2 L$, where T is torque, D is electrical machine diameter and L is electrical machine axial length. In a machine with a higher diameter to axial length ratio, the torque density possible is likely to increase in view of greater ease of cooling and therefore the potential for carrying more current in the same volume.

In some embodiments the axis of rotation of the electrical machine is canted with respect to the main axis of rotation of the gas turbine at an angle between 45° and 90°. Preferably the angle is between 70° and 90° and more preferably is between 80° and 90°. In some embodiments the axis of rotation of the electrical machine and axis of rotation of the gas turbine engine are substantially perpendicular. For electrical machines of ever increasing diameter relative to axial length, more economical packaging with respect to the remainder of the gas turbine may be achieved by increasing the cant of the electrical machine rotational axis towards 90°. In the case of aero gas turbines it may in particular be possible to reduce or negate the need for increases in nacelle diameter (locally and/or in general).

In some embodiments the electrical machine is angled so as a projection of its axis of rotation substantially intersects the axis of rotation of the gas turbine engine. This may mean that the electrical machine is orientated in a manner that reduces its greatest radial extent with respect to the gas turbine as a whole, potentially thereby increasing compactness.

In some embodiments the electrical machine has a diameter that is greater than its axial length. In some embodiments the ratio of the electrical machine axial length to its diameter is between 0.1:1 and 0.5:1. More specifically the ratio may be between 0.1:1 and 0.3:1 and may preferably be substantially 0.2:1. The packaging benefits of canting the electrical machine may increase as its diameter increases relative to its axial length. Increases in diameter may also offer additional benefits in terms of turn-down ratio and torque density as previously mentioned.

In some embodiments a rotor of the electrical machine is formed with a gear via which drive to and/or from the electrical machine is provided. By incorporating a gear with the rotor itself, the drive path to and/or from the electrical machine may be more direct. It may be that the gearing ratio provided by the rotor gear is acceptable or desirable for the intended drive to and/or from the electrical machine. This might for example eliminate the need for drive to and/or from the electrical machine to pass through a gearbox.

In some embodiments the rotor gear is provided at an outer circumferential surface of the rotor. This may give an increased step-down ratio.

In some embodiments the electrical machine is connected in a driving relationship to a main shaft of the gas turbine. In this way, during running of the gas turbine engine, the electrical machine may be driven by the gas turbine engine and therefore act as a generator providing electrical power for use by other components. Additionally or alternatively, the electrical machine may be connectable to an electrical supply in order that it acts as a motor, spinning the shaft to allow start of the gas turbine.

In some embodiments a drive path between the main shaft and electrical machine consists of an auxiliary shaft having a first gear that meshes with a corresponding gear of the main shaft and second gear that meshes with the rotor gear. The direct driving link between the main shaft and electrical machine provided by the auxiliary shaft may be facilitated by the topology of the electrical machine. Specifically, where the electrical machine has a relatively large diameter, the step-down ratio at the second gear and rotor gear may be relatively high. This may eliminate the need for the provision of a gearbox in the drive path in order that sufficient step-down is achieved. The drive path described may provide a space efficient connection between the main shaft and electrical machine.

In some embodiments the electrical machine is of a radial flux configuration. In alternative embodiments the electrical machine is of an axial flux configuration.

In some embodiments there are at least two electrical machines, each with their rotor gears meshed with the second gear. Each electrical machine may have any and/or all of the features previously described. The second gear may be provided circumferentially between two electrical machines. The auxiliary shaft may extend radially at a 6 o'clock position. Two electrical machines may be provided at 5 and 7 o'clock positions. The arrangements described may provide a space efficient and compact method of incorporating two or more electrical machines with the gas turbine. Nonetheless this is only one example and in alternative embodiments it may be that the auxiliary shaft and electrical machines are offset from the position described above. The auxiliary shaft and electrical machines may be provided anywhere in the bottom half of the engine between the 3 and 9 o'clock positions. A suitable selected location for the auxiliary shaft and electrical machines within the range described above may allow convenient access for maintenance etc whilst still ensuring that after engine shut down the components are not exposed to the worst of the residual heat produced by the engine.

In some embodiments the gas turbine engine is an aero gas turbine engine. Further the gas turbine engine may be a turbofan engine. The invention may have particular application to gas turbine engines in general and specifically to turbofan engines having a low bypass ratio to electrical power offtake requirement ratio in view of the impact of weight and packaging efficiency on their design.

In some embodiments the electrical machine is axially aligned with a high pressure compressor of the gas turbine engine.

In some embodiments the electrical machine is the or a main electrical machine of the gas turbine engine. The electrical machine may in use supply electrical power to at least one of the following aircraft and engine systems/components: avionics, hotel loads (kitchen, passenger media), lights, cabin air compressor, hydraulic pump (for control surfaces), wing anti ice resistors, nitrogen generator compressors, engine oil pumps and engine fuel pumps.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
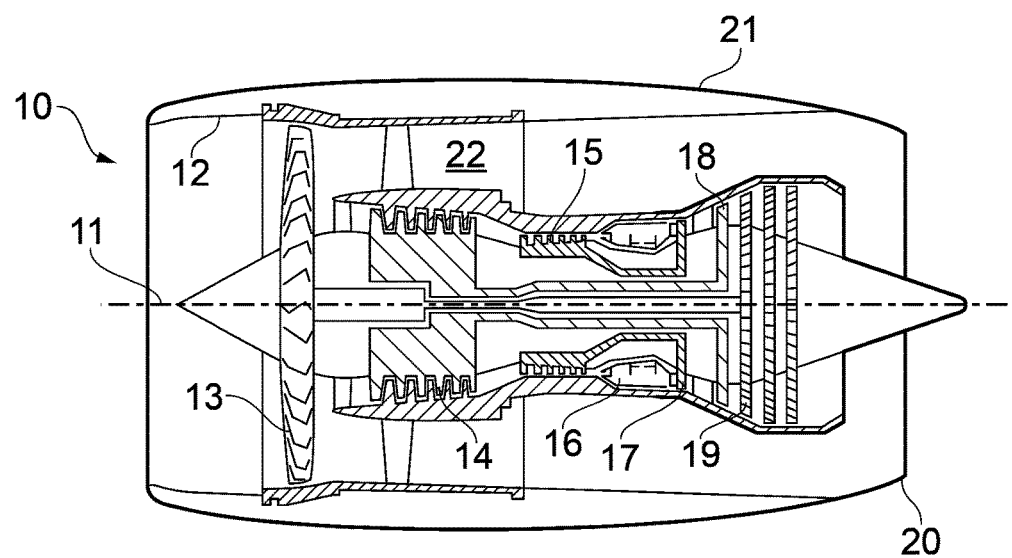
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
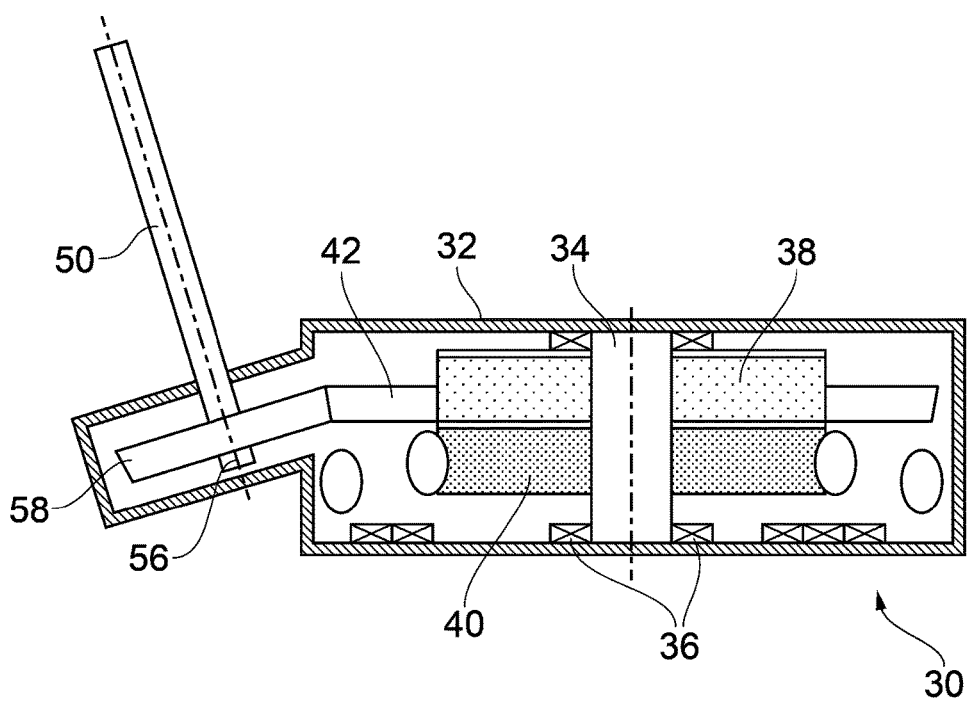
FIG. 2 is a cross-sectional view of an electrical machine as may be used in accordance with embodiments of the invention.

Referring now to FIG. 2 an electrical machine 30 as may be provided in the gas turbine engine 10 is shown. The electrical machine 30 has a generally cylindrical case 32 with a machine shaft 34 rotatably mounted thereto by bearings 36. The electrical machine 30 is of an axial flux configuration, having axially separated and adjacent rotor 38 and stator 40, both coaxial with and located about the machine shaft 34. The rotor 38 is fixed to and supported by the machine shaft 34, whereas the stator 40 is not fixed to the machine shaft 34, the machine shaft 34 simply passing through it.

The topology of the electrical machine 30 is such that the diameter of the electrical machine 30 is greater than its axial length. The ratios for both case 32 diameter to axial length, and for rotor 38 stator 40 combined diameter to combined axial length are at least 2.5:1.

Figure 7:
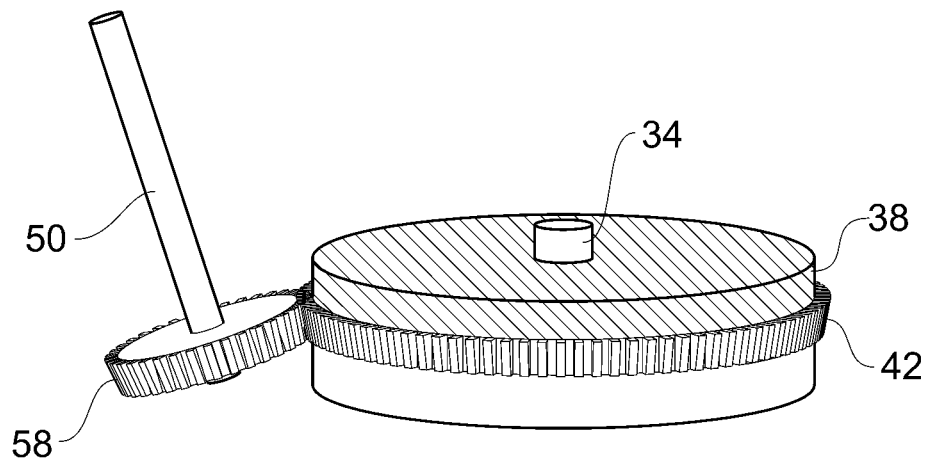
FIG. 7 is a schematic perspective diagram of the rotor gear 42.

Provided at an outer circumferential surface of the rotor 38 is a rotor gear 42 fixed relative to the rotor 38. The rotor gear 42 presents a complete ring of outwardly facing teeth (not shown) around the outer circumference of the rotor 38, as shown in FIG. 7.

Figure 3:
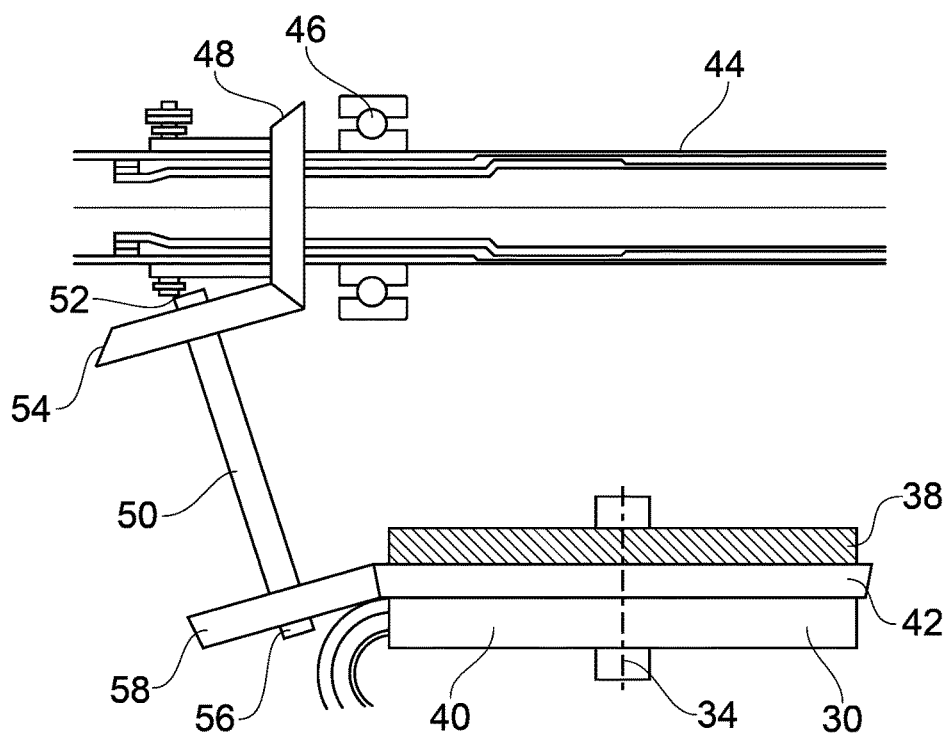
FIG. 3 is a side schematic view showing part of a gas turbine engine in accordance with an embodiment of the invention.

Referring now to FIGS. 2 and 3 a main shaft 44 of a gas turbine engine (in this case an aero turbofan engine) is shown. The shaft 44 is partially supported by a bearing 46. The main rotational axis of the gas turbine engine and rotational axis of the shaft 44 are parallel with the shaft 44. The shaft 44 is provided with a gear 48 that rotates with the shaft 44.

An auxiliary shaft 50 is also provided, extending substantially between the main shaft 44 and electrical machine 30. At a first end 52 the auxiliary shaft 50 has a first gear 54 that meshes with the gear 48 of the main shaft 44, and at a second end 56 has a second gear 58 that meshes with the rotor gear 42. The auxiliary shaft 50 therefore provides a drive path between the gear 48 of the main shaft 44 and the rotor gear 42 of the electrical machine 30. The relatively large diameter of the rotor gear 42 and relatively small diameter of the second gear 58 contributes to a step-down ratio from the shaft 34 to the rotor 38 of between four and eight times, more specifically between five and seven times and more specifically still of approximately six times.

As shown in FIG. 3, the electrical machine 30 has an axis of rotation (parallel to the machine shaft 34) that is canted with respect to the main rotational axis of the gas turbine engine. More specifically the axes of rotation of the gas turbine engine and electrical machine 30 are perpendicular to one another. Further, although not shown in the Figures, the electrical machine 30 is axially positioned within the gas turbine engine so as to be aligned with a high pressure compressor of the gas turbine. Because the high pressure compressor has a smaller radius than other turbines and compressors in the engine, this allows for the electrical machine 30 to be located at a smaller radial distance from the shaft 44 than might otherwise be possible.

In FIG. 3 the case 32 of the electrical machine 30 is not shown for clarity. Nonetheless in FIG. 2, the case 32 is shown to extend around a portion of the auxiliary shaft 50 encompassing the second gear 58.

In use the electrical machine 30 may be used in two configurations. In a first configuration the gas turbine engine is running and providing drive to the electrical machine 30 via the gear 48, auxiliary shaft 50 and rotor gear 42. The electrical machine therefore acts as a generator. The electrical machine 30 is the main electrical machine 30 of the gas turbine engine, and in generator mode is used to provide electrical power to the gas turbine engine and an associated aircraft.

In a second configuration the electrical machine 30 is used to turn the main shaft 44 as part of the gas turbine engine start procedure. In this configuration the electrical machine 30 therefore acts as a motor. Use of the electrical machine 30 as a motor may also be used to alleviate the impact of transient engine operation, delivering power to the gas turbine. The latter functionality relies on an external source of electrical power as may be provided by energy storage or another system (e.g. another engine or an auxiliary power unit).

Regardless of the operation configuration of the electrical machine 30, the step-down ratio from the main shaft 44 to the rotor 38 is desirable for safe and efficient rates of rotation of the main shaft 44 and rotor 38. Consequently it is possible to keep the driving link between the main shaft 44 and rotor 38 direct (i.e. via the auxiliary shaft 50). There is consequently no need for the drive to pass through a gearbox. Any gearbox provided (e.g. to deliver power to other components such as oil and fuel pumps) may therefore be less complicated, smaller and lighter. The orientation and diameter to axial length ratio of the electrical machine 30 therefore means not only that its radial footprint is minimised, but further allows for a relatively simple, small and light transmission system. The efficiency and compactness of design of the gas turbine engine may also be enhanced by locating the electrical machine 30 so as it is axially aligned with the high pressure compressor as previously mentioned. Further the electrical machine 30 may be located radially outward of the bypass duct or between the core and the by-pass duct.

Figure 4:
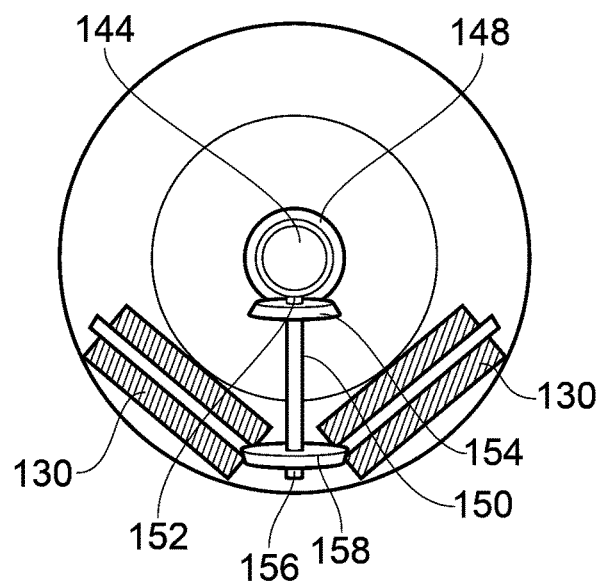
FIG. 4 is a front schematic view showing part of a gas turbine engine in accordance with an embodiment of the invention.

Referring now to FIG. 4, an alternative embodiment is shown. Similar features to those discussed with respect to FIGS. 2 and 3 are given like reference numerals in the series 100. The FIG. 4 arrangement is similar to the FIG. 1 arrangement, but two electrical machines 130 (similar to those of FIG. 2) are provided rather than one. This may be appropriate where additional electricity generation capacity is required during engine running and/or additional motor power is required for engine starting and/or redundancy or electrical system segregation is desired.

The axis of rotation of each electrical machine 130 is canted (in this case perpendicular) with respect to the main axis of rotation of the gas turbine engine. Further (and as before) each electrical machine 130 has a greater diameter than axial length. Both of these features offer the potential benefits previously discussed.

As previously the gas turbine engine has a main shaft 144 with a gear 148 provided thereon. The gear 148 meshes with a first gear 154 provided at a first end 152 of an auxiliary shaft 150. At an opposite second end 156 of the auxiliary shaft 150 is provided a second gear 158. The auxiliary shaft 150 extends radially outwards from the main shaft 144 at a 6 o'clock position (towards engine bottom dead centre). The electrical machines 130 are provided at the 5 and 7 o'clock positions respectively. The second gear 158 is positioned circumferentially between the two electrical machines 130 and meshes with respective rotor gears 142 of each.

In addition to having an axis of rotation that is perpendicular to the main rotational axis of the gas turbine engine, each electrical machine 130 is angled so as a projection of its axis of rotation intersects the axis of rotation of the gas turbine engine. In this way the greatest radial extent of each electrical machine 130 away from the shaft 144 is reduced. This may allow a reduction in the diameter of the gas turbine engine as a whole, potentially reducing drag.

Figure 5:
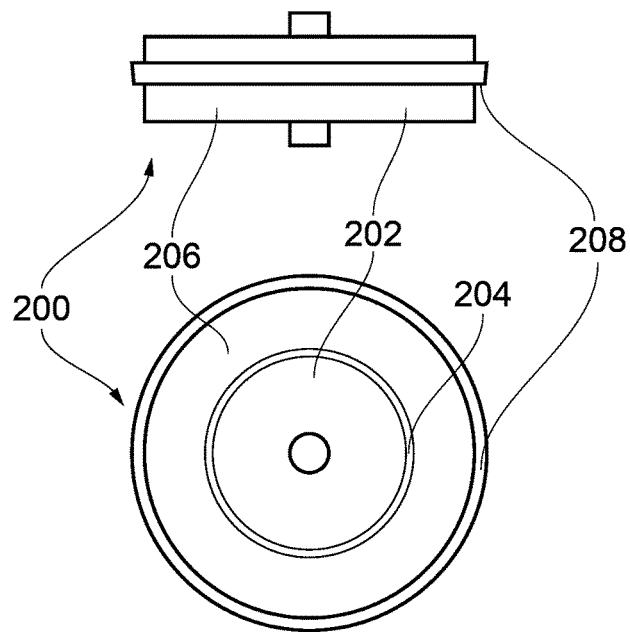
FIG. 5 shows a side and top view of a radial flux electrical machine as may be used in accordance with embodiments of the invention.
Figure 6:
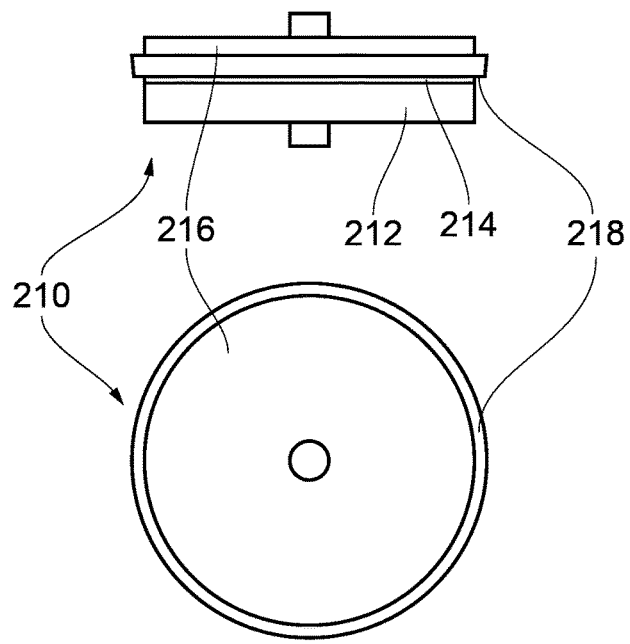
FIG. 6 shows a side and top view of an axial flux electrical machine as may be used in accordance with embodiments of the invention.

Referring now to FIGS. 5 and 6, it is noted that a requirement for an electrical machine to have a diameter greater than its axial length does not restrict a choice of electrical machine configuration to radial or axial flux.

FIG. 5 shows a radial flux electrical machine 200. The electrical machine 200 has a stator 202 an air gap 204, a rotor 206 and a rotor gear 208 provided at an outer circumferential surface of the rotor 206. This arrangement (with the rotor 206 positioned radially outward of the stator 202) may be advantageous because electromagnetically active parts of the electrical machine 200 (usually conductors or magnets), can be supported by the external structure of the rotor 206. Nonetheless, in alternative embodiments the rotor could be located radially inward of the stator. In that case the rotor gear might instead be associated with a shaft of the electrical machine rather than the rotor directly.

FIG. 6 shows a radial flux electrical machine 210. The electrical machine 210 has a stator 212 an air gap 214, a rotor 216 and a rotor gear 218 provided at an outer circumferential surface of the rotor 216.

As will be appreciated both electrical machines 200, 210 have a ratio of diameter to total axial length of approximately 4:1. In both cases this may give a desirable turn down ratio for a given total axial length in the context of embodiments of the present invention, where the axis of rotation of the relevant electrical machine 200, 210 is canted (e.g. perpendicular) to the main rotational axis of a gas turbine engine.

It will be understood that the invention is not limited to the embodiments above-described and various modifications and improvements can be made without departing from the various concepts described herein. It may be for example that embodiments of the invention are applicable to alternative aero gas turbines (e.g. turbojets, turboprops or open rotor engines) and/or non-aero gas turbines (e.g. marine or land based). Except where mutually exclusive, any of the features may be employed separately or in combination with any other features and the invention extends to and includes all combinations and sub-combinations of one or more features described herein in any form of gas turbine engine.

The invention claimed is:
1. A gas turbine engine comprising:
an electrical machine, including a rotor comprising a rotor gear via which driving of and/or by the electrical machine is provided,
the rotor near being provided at an outer circumferential surface of the rotor,
the electrical machine being connected in a driving relationship to a main shaft of the gas turbine,
a drive path between the main shaft and electrical machine being provided only by an auxiliary shaft having a first gear that meshes with a corresponding gear of the main shaft and a second gear that meshes with the rotor gear, the electrical machine having an axis of rotation that is canted with respect to the main rotational axis of the gas turbine engine.

2. The gas turbine engine according to claim 1 where the axis of rotation of the electrical machine is canted with respect to the main axis of rotation of the gas turbine at an angle between 70° and 90°.

3. The gas turbine engine according to claim 1 where the electrical machine is angled so as a projection of its axis of rotation substantially intersects the axis of rotation of the gas turbine engine.

4. The gas turbine engine according to claim 1 where the electrical machine has a diameter that is greater than its axial length.

5. The gas turbine engine according to claim 1 where there are at least two electrical machines, each with their rotor gears meshed with the second gear.

6. The gas turbine engine according to claim 5 where the auxiliary shaft extends radially at a 6 o'clock position.

7. The gas turbine engine according to claim 5 where the second gear is provided circumferentially between two electrical machines.

8. The gas turbine engine according to claim 5 where two electrical machines are provided at 5 and 7 o'clock positions.

9. The gas turbine engine according to claim 1 where the gas turbine engine is an aero gas turbine engine.

10. The gas turbine engine according to claim 1, wherein the rotor gear is fixed relative to the rotor.

11. A gas turbine engine comprising:
an electrical machine, including a rotor comprising a rotor gear via which driving of and/or by the electrical machine is provided,
the rotor gear being provided at an outer circumferential surface of the rotor,
the electrical machine being connected in a driving relationship to a main shaft of the gas turbine,
a drive path between the main shaft and electrical machine being provided by an auxiliary shaft having a first gear that meshes with a corresponding gear of the main shaft and a second gear that meshes with the rotor gear, the electrical machine having an axis of rotation that is canted with respect to the main rotational axis of the gas turbine engine,
the rotor gear presenting a complete ring of outwardly facing teeth around the outer circumference of the rotor.

* * * * *